Figure 1:
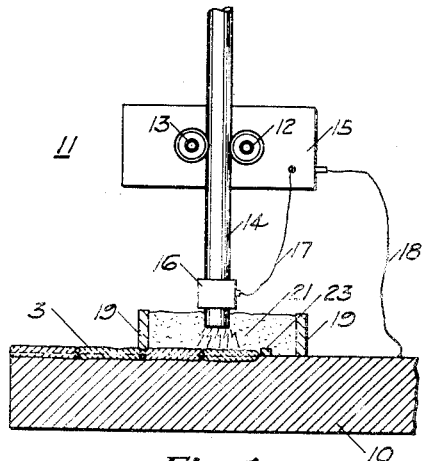

Feb. 27, 1940.   R. K. HOPKINS   2,191,469
VENEERING OF METALLIC SURFACES
Filed Feb. 18, 1936

INVENTOR
Robert K. Hopkins
BY Virgil F. Davis
ATTORNEY

Patented Feb. 27, 1940

2,191,469

UNITED STATES PATENT OFFICE 2,191,469

VENEERING OF METALLIC SURFACES

Robert K. Hopkins, New York, N. Y., assignor to The M. W. Kellogg Co., New York, N. Y., a corporation of Delaware Application February 18, 1936, Serial No. 64,496

17 Claims. (Cl. 219—10)

This invention relates in general to the manufacture of composite material and in particular to the coating of base metal with a protective metallic veneer.

It is an object of this invention to provide a simple and inexpensive method for coating base metal with a coating of veneer metal in which the veneer metal is inseparably and continuously bonded to the base metal throughout by fusion welding.

It is an object of the invention to provide a simple and inexpensive method for coating base metal with a coating of veneer metal in which the veneer metal is produced on the base metal, beneath a protective blanket of flux by the electric arc fusion of metal of the base and metal supplied to the electric arc whereby the veneer metal includes constituents derived from the base metal and is inseparably and continuously fusion welded to the base metal throughout.

It is a further object of the invention to provide a method for coating surface of a base metal with a coating of veneer metal of desired composition in which the veneer metal is produced on the base metal, beneath a protective blanket of flux, by electric arc fusion of a depth of the base metal and metal supplied to the electric arc, the composition of the metal supplied to the arc being so chosen and the fusion of the metals being so controlled that veneer metal of the desired composition is produced inseparably and continuously united throughout to the base metal.

It is also an object of the invention to provide a method for coating surface of a base metal with a coating of veneer metal or desired composition in which electric current is discharged, beneath the surface of protective blanket of flux, between the end of a metal electrode and the surface of the base metal to fuse metal of the electrode, metal of the base and metal that may be supplied from a separate source to the arc together into a common pool, and relative motion is effected between the electrode and the base metal to form the pool into a wide elongated band of veneer metal which upon cooling is inseparably bonded throughout to the base metal, the composition of the electrode and the metal supplied from a separate source being so chosen and the metal fusing and band forming operation being so controlled to produce a band of veneer metal of desired analysis; the band forming operation being repeated as required to cover the surface or a part of the surface of the base metal, adjacent veneer metal bands being overlapped an amount sufficient to assure a continuous body of veneer metal that is united to the base metal throughout its extent.

It is a still further object of the invention to provide a method for coating surface of a base metal with a coating of veneer metal that is produced in the form of a band, or a plurality of overlapping bands, by the fusion, under the influence of the electric arc submerged beneath the surface of a blanket of protective flux, of metal of the base, electrode metal and other metal that may be supplied from a separate source to the arc, in which a plurality of electrodes are employed and the electrodes so spaced from each other that the penetration into the base metal is controlled and made substantially uniform throughout the cross-section of the band, fusion of the veneer metal to the base metal throughout is assured without unbonded overlap along the edges of the band, and a band is produced of a width greater than the aggregate width of the bands that can be produced by the individual use of the same electrodes.

Figure 2:
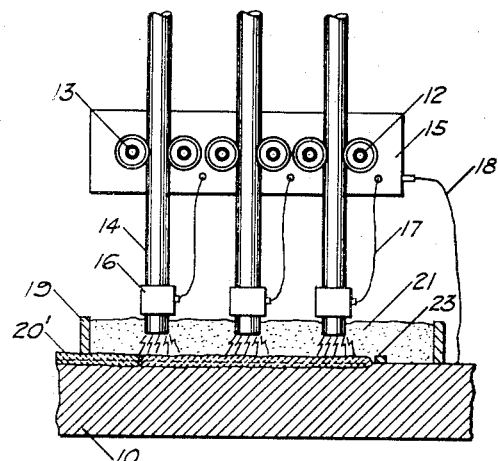
Figure 3:
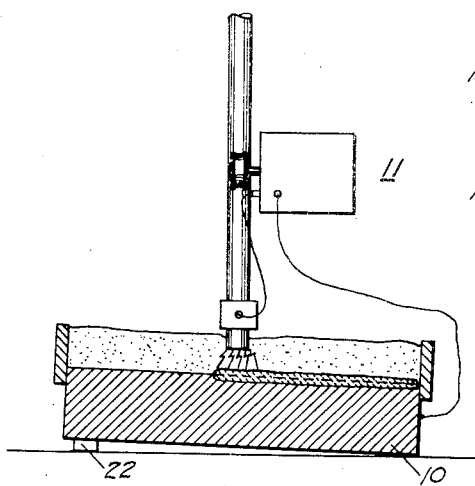
Figure 4:
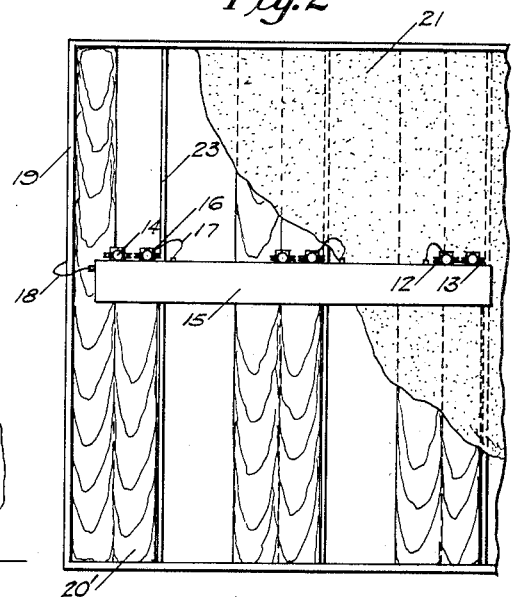
Figure 5:
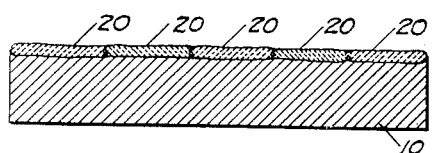

The further objects and advantages of the invention will be apparent from a consideration of the following description of the present preferred mode of carrying the invention out in practice together with the accompanying drawing, in which, Fig. 1 is part sectional front elevation of apparatus for carrying out my invention, Fig. 2 is a view similar to that of Fig. 1 illustrating the use of a plurality of electrodes, Fig. 3 is a side view of the apparatus of Fig. 1 or 2 and illustrates the tilting of the base metal, Fig. 4 is a plan view illustrating the simultaneous deposition of a plurality of spaced bands of the coating metal, and Fig. 5 is a sectional view of a plate coated in accordance with the method of my invention.

While my invention is of general application and can be applied to the coating of metallic surfaces of whatsoever character with practically any metal or alloy, for the purposes of this disclosure my invention will be described in connection with the coating of steel surfaces with corrosion resistant metal.

As shown in Fig. 1, plate 10, to be coated, is positioned beneath the welding head of welding machine 11. Welding machine 11 includes an electrode feed wheel 12 which is backed up by a backing roller 13 for feeding electrode 14 towards plate 10. Welding machine 11 may be of any preferred construction and includes arrangements for effecting any desired movement between plate 10 and electrode 14. Machine 11 also includes the usual devices for regulating and controlling the welding current and voltage and for controlling the feed of electrode 14 to maintain an arc of desired characteristics. Machine 11 may include a welding current generator or it may be supplied with welding current from a separate source. For the purpose of this description all of these usual controls, arrangements, and devices will be considered as located within box 15. Machine 11 is also provided with a contact device 16 for connecting electrode 14 to one side of the welding current supply through cable 17. Contact device 16 may also be of any preferred construction. A cable 18 is also provided for connecting plate 10 to the other side of the welding current supply.

Electrode 14 may be of any preferred form, thus it may be solid or hollow, it may be round, square or of any other cross section, and it may be bare or externally covered, or when hollow may be internally covered. As will be more apparent hereinafter, the function of electrode 14 is to supply constituents of the desired coating. These constituents may be supplied in whole or in part by the electrode. When a covering is used these constituents may be supplied in part by the metallic core of the electrode and in part by the covering. Also, these constituents may be supplied in part by the electrode and in part by other means as will be disclosed hereinafter.

Electrode 14 may be of any preferred length and may be supplied from a reel which may be supported from machine 11. When electrode 14 is formed in lengths that can be easily handled it may be made in effect continuous by providing arrangements for quickly joining the lengths together during their use.

To cover plate 10 with the desired coating, plate 10 is substantially horizontally positioned beneath the welding head of welding machine 11 with the point, where it is desired to start the first band 20, beneath electrode 14. A light frame 19 is placed around the area of the surface of plate 10 that is to be covered by the first bead or band 20 and is then filled with a flux to form a flux blanket 21 of substantial thickness.

The flux may be any fusible compound, or mixture of fusible compounds, that are substantially non-gassing under the influence of the arc and do not substantially add any undesirable constituents to or remove any desirable constituents from the deposited molten metal. Fused silicates such as manganese silicate, iron silicate, calcium silicate, glass and the like, and mixtures thereof, are suitable flux compounds although the invention is not limited thereto; any compound or compounds may be used that have the required characteristics. While the flux should be easily fusible in the arc its melting point should be high enough to assure that when molten it does not flow too readily but remains on, and in the immediate vicinity of, the molten metal to form a heat retaining and gas excluding blanket for the molten metal.

Another important feature of the flux blanket is that it effectually prevents the spattering or "blowing" of molten metal away from the work. With the high energy inputs used, amounting to forty-five or more kilowatts at each arc, this smothering action of the flux blanket is of paramount importance. To one familiar with the violence of the action of a high energy arc the quiet action of the blanketed arc is remarkable. The flux is preferably used in the granular form and while great variation is possible in the size of the flux particles without appreciably affecting the process, it is at present preferred to employ a flux the particles of which vary from powder size to ¼ of an inch. The flux blanket 21, as stated, should be of substantial depth so that it will protect the arc, prevent the atmosphere from contacting the fused metal, and prevent the spattering and "blowing" of the molten metal. Flux blankets varying in depth from one inch or less to six inches or more have been satisfactorily used. At present, with an input of 45 k. w. at each arc a blanket 21, three inches in thickness has been found satisfactory. Due to its substantially inert character the loss of flux during the coating operation is very small and as its characteristics are substantially unchanged it may be re-used. While it is at present preferred to form flux blanket 21 as just described, it may be formed in various other ways, for instance, it may be placed on plate 10 in the molten condition and maintained molten by the addition of heat when required, during the subsequent operations.

Electrode 14 is then positioned between feed roller 12 and back-up roller 13 and fed through contact device 16 toward the surface of plate 10. This of course can be done, if preferred, prior to the formation of flux blanket 21. In any case, the end of electrode 14 is made to contact with the surface of plate 10, flux being removed temporarily when necessary, preparatory, to striking the arc. To facilitate the striking of the arc, particularly when electrode 14 is of large size, any of the well known arc striking expedients may be used. The arc control arrangements are then set to maintain an arc of predetermined voltage and amperage, and the arc struck. Plate 10 or electrode 14 is then moved in a straight line at a predetermined rate to deposit the coating metal in the form of a band 20. The arc is allowed to continue to play between the end of electrode 14 and the surface of plate 10 until band 20 extends the full length of plate 10. When that occurs the arc is broken and the blanket allowed to remain on the surface of plate 10 until it has solidified to such a degree that it may be easily removed.

During the play of the arc between the surface of plate 10 and the end of electrode 14 the surface of plate 10 in the region of the arc is melted as is the end of electrode 14. The heat of the arc also causes the flux of flux blanket 21 adjacent the arc to fuse and cover the pool of molten metal. That results from the melting of the electrode and the plate. The molten slag serves to prevent the rapid cooling of the molten metal, thus permitting it to spread a considerable distance away from the arc and to fuse to the plate 10 through the whole area covered by the pool of molten metal. By movement of the plate 10 relative to the electrode 14, as already described, the molten metal is formed into a continuous band 20. The blanketing action of the flux 21 maintains the metal in the molten condition for a sufficient length of time to assure a uniform distribution of the constituents of the molten metal and permits the molten metal to solidify with a remarkably smooth surface and uniform thickness throughout its width as well as relatively uniform penetration into plate 10. By reason of all this the width of band 20 is much wider than the bead that can be deposited from an electrode of the same size by the present practice and is wider than the electrode 14. A band 20 has been deposited from an electrode of ¼ of an inch diameter which was two inches wide, ⅜" to ½" thick and penetrated into the base plate from ⅛" to ¼".

It will be readily understood from the foregoing that the band 20 is composed of material derived from the base metal plate 10, the electrode 14, and from any added source of material as will be more fully disclosed. It is also apparent that the composition of the band 20 will be dependent upon (a) the composition of the base metal and the rate at which it is melted, (b) the composition of the electrode and the rate at which it is also melted, and (c) the composition of any added material and the rate at which it is added.

There are a number of ways in which the desired composition of the band 20 may be obtained. The base metal plate is usually of a composition dictated by economic or structural considerations and may for example be a plain carbon steel suitable for the required service in all respects except in its susceptibility to corrosion. It may be desired to secure a coating on this base of a corrosion resistant alloy such as a stainless steel relatively high in chromium. To this end I may use as an electrode a solid rod made of an alloy of steel and chromium of such composition that, when combined with the proportion of plain steel from the base metal which experience has taught me to expect, the desired chrome steel alloy will result. Thus, by way of example, I may know that, under the welding conditions of current, voltage, rate of travel, size of electrode, character of flux, etc., that I desire to use, I will obtain a penetration of say 50% into the base metal. By this I mean that of the alloy band 50% of it will lie below the former surface of the base metal and 50% will lie above that surface, or in other words that 50% of the material comprising the coating will have been derived from the base metal and 50% will have to be supplied by the electrode. From this it is a simple calculation to determine the required percentage of chromium in the electrode to give the desired result. Thus, for example, if it is desired that the coating shall contain say 12% chromium, the chromium content of the electrode under these conditions must be 12%/.50=24%. This figure, 24%, does not include the chromium loss at the arc and in proportioning the electrode an excess of chromium will be added to compensate for the loss of chromium at the arc. Thus by using a solid alloy electrode of proper composition the desired result may be secured.

I have found that the same result may be attained by the use of a composite electrode such as a plain steel electrode which has associated with it the proper amount of alloying material. For example, a hollow steel tube in which is packed as a core the alloying material in proper proportions has been found entirely satisfactory. Thus a steel tube packed with ferrochromium and a binder may be used to deposit a chrome steel coating. Here it is only necessary that the electrode be so proportioned that the average cross section thereof shall contain the required percentage of chromium. The alloying material may be carried by the electrode in any manner, as for example as an external coating held together and to the metal by a suitable binder.

While an electrode as just described is highly satisfactory and in many ways superior to the solid alloy electrode, its fabrication is somewhat troublesome. I have found that, instead of using a composite electrode as described, I may procure the same result by using a plain metal electrode and introducing the alloying material separately into the region of the arc. In a preferred form of this mode of operation of my invention I employ a tubular electrode through which I pour at a regulated rate a stream of ground or powdered alloying material, thus introducing it directly into the arc and forming the desired alloy. For example in coating steel with a chrome steel alloy I have employed sections of steel pipe as the electrode through which I have poured powdered ferrochromium at such a rate that the desired composition is obtained. The alloying material may be supplied at the desired rate by discharging it through a calibrated orifice or by other suitable means.

One of the remarkable features of my invention is that although the materials may be supplied from diverse sources the composition of the layer of coating material is substantially uniform throughout. There is a sharp line of demarcation between the base metal and the coating and analysis of the coating shows that there is little or no change in its composition from points adjacent to the base metal to points on the outer surface of the coating.

As above stated the penetration into the surface of plate 10 is a factor in determining the composition of the veneer. Among the factors affecting penetration may be mentioned the rate of travel of the electrode relative to the base metal, the current density and total energy input at the arc, the temperature of the base metal, and position of the base metal with respect to the horizontal. By controlling these factors a desired penetration may be obtained.

The rate of travel has been found to have an important bearing on the degree of penetration, in general a high rate results in a higher penetration than a lower rate, within certain limits. This is probably due to the fact that when the travel takes place at the lower rate a pool of molten metal separates the arc from the solid base metal and thus reduces the amount of base metal that is melted. The current density has a marked effect on penetration, thus with a high current density the penetration is high and with a lower current density the penetration is less for the same energy input.

The temperature of the base metal is important as the higher the temperature of the base metal the greater the penetration for a given set of conditions. Thus with a given rate of travel a high plate temperature results in a deeper melting of the base plate. It is found, however, that if a higher plate temperature is used a higher rate of travel may be employed without increasing the penetration. I therefore may take advantage of this penetration control factor and preheat plate 10 prior to the deposition of band 20. The preheating of plate 10 furthermore, assures a slower cooling of the metal of band 20 and thus eliminates, or at least materially reduces, the possibility of shrinkage cracks in band 20; also, the preheating of plate 10 promotes a better edge condition, that is to say, when plate 10 is preheated a better and more complete bond is obtained between the metal at the edges of band 20 and the surface of plate 10.

The penetration may be also controlled within rather wide limits by tilting the base plate relative to the electrode. I have found that the presence of a pool of molten metal between the arc and the surface of the base plate reduces the amount of the base metal that is melted by the arc and hence the penetration into the base metal. Thus by tilting plate 10 relative to the horizontal the depth of the pool may be increased or diminished to increase or diminish penetration as desired. In other words, when a given set of conditions, otherwise preferred for the work in hand, result in an insufficient penetration, the penetration may be increased to the desired value without changing any other conditions by simply tilting plate 10 so that the molten metal will flow downhill away from beneath the arc in a direction opposite to the direction in which the arc is moved. This results in a lessening of the depth of the pool beneath the arc and in an increase in the penetration. The use of this expedient is illustrated in Fig. 3 wherein plate 10 is tilted by means of block 22 placed between the bottom of plate 10 and the base of machine 11. When it is desired to decrease the penetration plate 10 is so tilted that the molten metal flows downhill to the arc thus increasing the pool beneath the arc. It should also be evident that by tilting plate 10, other operating conditions may be varied and otherwise unobtainable, or at least difficultly obtainable, results obtained. Thus by tilting plate 10 in accordance with the above, with a given electrode and a constant energy input to the arc a predetermined penetration may be maintained while varying the current density and/or the rate of travel.

By varying the factors that effect the penetration, it is possible to produce bands 20 that have practically any desired relation between penetration and deposited metal. Because of the number of factors involved and the variations of each factor possible, no attempt will be made to set forth the specific manner for obtaining any particular penetration. It is believed that the above explanation will enable any skilled worker in the art to obtain any desired penetration in the range above set forth.

Having completely described the deposition of the first band 20 it is apparent that the whole surface of the plate may be covered by depositing adjoining bands 20. To assure the production of a continuous surface of veneering material, bands 20 are deposited sufficiently close together so that adjacent edges fuse into each other and to the plate as shown in Figs. 1 and 5. It is to be particularly noted that the showings of Figs. 1 and 5 and also of Fig. 2 are somewhat exaggerated to better emphasize the plurality of bands. Actually the bands more completely merge than shown and are to all appearances a single homogeneous layer of veneering metal.

In depositing bands 20 as described, the electrode may have a simple straight line movement relative to plate 10 or it may be oscillated across the face of plate 10 in a zig-zag path. The oscillatory movement tends to give a wider band. The oscillation of the electrode is susceptible to considerable variation but care should be taken not to have the pitch of the oscillations too great or the danger of unfused areas between the electrode paths arises.

I have found that the formation of a continuous veneer without unfused areas between bands 20 and without the necessity of overlapping the bands an excessive amount is facilitated by so depositing the bands that their width is substantially uniform throughout and their edges are substantially straight. A simple way of accomplishing this desirable result is to provide a strip 23 of any suitable material adjacent the line of the outer edge of the band 20 to be deposited. Strip 23 is positioned on the face of plate 10, as by tack welding when strip 23 is made of metal, and is preferably of a height more or less equal to the height of the desired band 20. Strip 23, while it does not come into contact with the molten metal, so restrains the flow of the molten flux and molten metal that the band is formed with a straight edge separated from strip 23 by a thin layer of flux. The strip 23 is easily removed and can be used in the preparation of the next band. Whenever a band 20 is being laid not adjacent to another band it is apparent that strips 23 may be used for both sides of this band 20.

While it is to be understood that strip 23 is not comparable to the usual welding dam which is used to define the edge of a welding groove as in ordinary electric arc welding, it may be made to form a part of the band of coating material. This may be accomplished by so positioning the strip 23 that it is fused by the molten metal of the band being formed so that it becomes an integral part of the band. When this mode of operation is employed the composition of the strip 23 should approximate that of the desired veneer.

While the method of the invention may be successfully carried out with one electrode 14, as described above, I have found that the veneering operation may be more economically carried out with a plurality of electrodes operating simultaneously. An arrangement of apparatus for veneering with a plurality of electrodes 14 is shown in Fig. 2, and in this figure the same reference numerals are used to designate the apparatus elements shown in Figs. 1 and 3.

As shown in Fig. 2, three electrodes 14 are used simultaneously to deposit a single wide band 20'. While three electrodes 14 have been shown, it is to be understood that any number may well be used.

The electrodes 14 of Fig. 2 may be each individually controlled to maintain at each of them an arc of predetermined characteristics, or the electrodes may all be fed towards plate 10 at the same rate and the rate of feed controlled in accordance with the arc of one of them to maintain that arc as well as the other arcs as predetermined. The electrodes 14 may all be supplied from one current source or they may each be supplied from a separate source. All of the electrodes may be moved in a straight line relative to plate 10 or all of the electrodes may be moved in zig-zag lines relative to plate 10. I may move the two edge electrodes in a straight line and have all of the electrodes between them move in zig-zag lines. At present I prefer to move the electrode adjacent a previously laid band along a straight line and slightly overlapping the edge of the previous band and to oscillate all of the other electrodes, or the other electrode when only two are used, thus assuring complete fusion with the previously laid band and securing the advantages of oscillating the other electrodes. Electrodes 14 are so spaced relative to each other that when they are moved relative to plate 10 the molten metal is formed into a single continuous wide band 20'. It is to be particularly noted that band 20' is wider than an equivalent number of bands 20 as laid down by a single electrode 14. This is primarily due to the fact that in depositing band 20' it is not necessary to overlap the component bands as is the case when these bands are laid individually as all of the component bands are molten at one time and merge into a single continuous band 20'.

The plurality of electrodes 14 has been shown as located in a straight line across their path. Electrodes need not however be so located and may be located in any preferred manner, thus they may be staggered or arranged in a straight line that is other than perpendicular to the path. In any case the electrodes must produce a single wide band 20' when the electrodes are moved relative to plate 10.

Bands 20' may be deposited successively until the whole surface of plate 10 is covered, as described in connection with bands 20 for a single electrode. In so covering plate 10 the edges of the previously deposited bands 20' are overlapped, also as previously described, to assure the bands 20' being fused into a single wider band. A strip 23 is also used as before particularly described, to form the outside edge of bands 20' as a straight line.

The electrodes may all be of the same character and composition to give the veneer of desired composition. However, the electrodes may be of different character and composition. Thus in forming a chromium-iron veneer on a carbon steel plate, one of the electrodes may be of high chromium alloy and all of the others carbon steel, or they may all be of carbon steel and one or more of them carry the necessary chromium as an internal core or as an external covering, or they may all be of carbon steel and the alloying material introduced through one or more of them as by pouring. I find that when any of the expedients just mentioned are employed the composition of large band 20' is as uniform as the composition of band 20, as previously mentioned, deposited from a single electrode.

In regard to penetration and penetration control, the same factors already described in connection with the single electrode apply.

The surface of plate 10 may be covered by laying the bands 20 or 20' in the sequence above described or it may be covered by laying a plurality of spaced bands 20 or 20' simultaneously and then filling in the space between the bands 20 or 20' by depositing further bands 20 or 20'. As may be inferred from what has just been stated this may be done either with a single electrode for each band 20 or with a plurality of electrodes for each band 20'. Figure 4 illustrates this manner of depositing bands 20', i. e. when a plurality of electrodes is used for each band.

While the method of this invention has been described in connection with the veneering of plate it is to be understood that it is not limited to such veneering and can be used in veneering metallic surfaces in general whether they occur on raw material, or on finished or semi-finished articles. It is also to be particularly understood that while in the above description the veneering of metallic surfaces with protective alloys or pure metals has been referred to the invention is not so limited and may be applied to veneering in general regardless of the composition of the base metal and the composition of the veneer as well as the purpose for the veneering.

While bands 20 and 20' have been described as straight bands it is to be understood that the invention is not limited to straight bands as the veneering metal may be deposited in any preferred manner; thus, the bands may be in the form of involutes, circles, etc.

Particular embodiments of the invention and preferred modes of carrying out the invention in practice have been disclosed, the invention is however not limited to said embodiments and said modes but such modifications and variations are also contemplated as fall within the scope of the invention which is set forth in the appended claims.

By the use of my invention, the entire surface of the base metal to be coated is intended to be fused with the veneering materials as distinguished from the laying of a preformed sheet of lining material on the base metal and securing it thereto by fusion at spaced points or lines.

I claim:

1. The method of coating base metal with a metal veneer which comprises, covering a surface of the base metal with a blanket of flux, discharging electric current through a gap beneath the surface of the flux blanket to fuse directly a depth of the base metal and supplying metal to the gap to be fused and intermingled with the fused metal of the base to form the veneer metal, said gap being submerged beneath the surface of the blanket of flux during the operation.

2. The method of coating base metal with a protective metal veneer which comprises forming the metal veneer beneath the surface of a blanket of substantially non-gassing flux by electric arc fusion of a depth of the base metal and metal separately supplied to the arc whereby the veneer metal is fusion welded to the base metal, the arc being submerged beneath the surface of the flux blanket during the operation.

3. The method of coating base metal with a veneer metal of a desired composition which comprises, fusing a depth of the base metal by means of an electric arc directed against the base metal, supplying metal of a composition different from said base metal to be melted by the arc and alloyed with the fused base metal and controlling the depth of fusion of the base metal and the rate of supply of said metal of different composition to produce a veneer metal of desired composition fusion welded throughout to the base metal, the electric arc being submerged beneath the surface of a blanket of flux during the operation.

4. The method of coating a base metal with a coating of veneer metal which comprises, covering a surface of the base metal with a protective blanket of flux, discharging electric current through a gap beneath the surface of the flux blanket between the end of a metal electrode and the surface of the base metal to fuse metal of the electrode and metal of the base into a common mass which upon solidification provides veneer metal fusion welded throughout to the base metal, the gap being submerged beneath the surface of the blanket of flux during the operation.

5. The method of coating base metal with a coating of veneer metal of desired composition which comprises, covering a surface of the base metal with a protective blanket of flux, discharging electric current through a gap beneath the surface of the flux blanket between the end of a metal electrode and the surface of the base metal to fuse metal of the electrode and metal of the base into a common mass fusion welded to the base metal, simultaneously supplying further metal to the gap to be fused and intermingled with the metal fused from the base metal and the electrode, and controlling the depth of fusion of the base metal, the rate of fusion of the electrode metal and the rate of supply of said further metal to produce a veneer of desired analysis, the gap being submerged beneath the surface of the blanket of flux during the operation.

6. The method of coating a base metal with a coating of veneer metal which comprises, covering a surface of the base metal with a protective blanket of flux, discharging electric current through a gap beneath the surface of the flux blanket between the end of a metal electrode and the surface of the base metal to fuse metal of the electrode and metal of the base into a common pool, and effecting relative movement between the electrode and the base metal to form said common pool into an elongated band of veneer metal fusion welded to the base metal throughout their common extent, the gap being submerged beneath the surface of the flux blanket during the operation.

7. The method of coating a base metal with a coating of veneer metal which comprises, discharging electric current though a gap between the end of a metal electrode and the surface of the base metal, to fuse metal of the electrode and metal of the base into a common pool, effecting relative movement between the electrode and the base metal to form said pool into an elongated band of veneer metal fusion welded to the base metal throughout their common extent, and adjusting the characteristics of the discharge, its rate of movement over the surface of the base and the angular relation of said surface with respect to the horizontal to obtain a predetermined depth of fusion of the base metal through the length of said elongated band, the gap being submerged beneath the surface of a protective blanket of flux during the operation.

8. The method of coating a base metal with a coating of veneer metal which comprises, covering a surface of the base metal with a protective blanket of flux, discharging electric current through a gap beneath the surface of the flux blanket between the end of a metal electrode and the surface of the base metal to fuse metal of the electrode and metal of the base into a common pool, effecting relative movement between the electrode and the base metal to form said pool into an elongated band of veneer metal fusion welded to the base metal throughout their common extent, the gap being submerged beneath the surface of the blanket of flux during the operation, and repeating the band-forming operation to cover the surface of the base metal to the extent desired, adjacent bands being overlapped an amount sufficient to assure continuous veneer metal fusion welded to the base metal throughout their common extent.

9. The method of coating a base metal with veneer metal of desired analysis which comprises, covering a surface of the base metal with a protective blanket of flux, discharging electric current through a gap beneath the surface of the flux blanket to fuse directly a depth of the base metal, supplying additional metal to said gap to be fused thereat and alloyed with the metal fused from the base metal to form a common pool, moving the gap over the surface of the base metal to form said pool into an elongated band of veneer metal fusion welded to the base metal throughout their common extent, and controlling the rate at which the additional metal is supplied to the gap, the depth of fusion of the surface metal and the movement of the gap to produce a veneer band of desired analysis, the gap being submerged beneath the surface of the blanket of flux during the operation.

10. The method of coating a base metal with veneer metal of desired analysis which comprises, covering a surface of the base metal with a protective blanket of flux, discharging electric current from the end of a metal electrode through a gap beneath the surface of the flux blanket to fuse a depth of the base metal and metal of the electrode into a common pool, simultaneously supplying additional metal to the gap to be fused thereat and intermingled in said pool, moving the gap over the surface of the base metal to form said pool into an elongated band of veneer metal fusion welded to the base metal throughout their common extent, and controlling the rate of fusion of the electrode, the rate of supply of the additional metal, the depth of fusion of the base metal and the movement of the gap to produce a veneer band of desired analysis, the gap being submerged beneath the surface of the blanket of flux during the operation.

11. The method of coating base metal with a protective metal veneer which comprises, discharging electric current through a plurality of gaps, beneath the surface of a protective blanket of flux, to fuse directly a depth of the base metal, supplying additional metal to the gaps to be fused and intermingled with said depth of base metal, the gaps being so spaced apart that' the metal fused results in a common continuous molten pool that extends a substantially uniform depth throughout below the original surface of the base metal, and moving the gaps as a unit along the surface of the base metal to elongate the common pool into a continuous band of veneer metal of substantially uniform thickness fusion welded to the base metal throughout their common extent, the gaps being submerged beneath the surface of the blanket of flux during the operation.

12. The method of coating base metal with a protective metal veneer which comprises, discharging electric current through a plurality of spaced gaps beneath the surface of a protective blanket of flux to fuse a depth of the base metal, supplying additional metal to the gaps to be fused and intermingled with said depth of base metal, the gaps being so spaced apart that the metal fused by them results in a common continuous molten metal pool, and moving the gaps as a unit along the surface of the base metal to elongate the common pool into a continuous wide band of veneer metal fusion welded to the base metal throughout their common extent, the gaps being submerged beneath the surface of a protective blanket of flux during the operation, the gaps furthermore being so spaced that the contour of the cross section of the resulting band of veneer is substantially uniform both above and below the initial surface of the base metal and a fusion bond between veneer metal and base metal obtains to the very edges of the veneer band without substantial overlay of unbonded veneer metal on the base metal.

13. The method of coating base metal with a coating of veneer metal of desired composition which comprises, covering a surface of the base metal with a protective blanket of flux, discharging electric current through a plurality of gaps beneath the surface of the flux blanket between the ends of a plurality of metal electrodes and the surface of the base metal to fuse metal of the electrodes and metal of the base, the gaps being so spaced that the metal fused forms a common continuous molten pool, at least one of the electrodes being of different composition from the remainder of the electrodes, and adjusting the composition of the electrodes, their melting rates and the depth of fusion of the base metal to produce veneer metal of desired analysis, the gaps being submerged beneath the surface of the flux blanket during the operation.

14. The method of coating a base metal with a coating of veneer metal which comprises, covering a surface of the base metal with a protective blanket of flux, discharging electric current through a plurality of gaps beneath the surface of the flux blanket between the ends of a plurality of metal electrodes and the surface of the base metal to fuse metal of the electrodes and metal of the base, the gaps being so spaced that the metal fused by them forms a common continuous molten pool, at least one of the electrodes being of a different composition from the remainder of the electrodes, moving the gaps along the surface to elongate the molten pool into a wide continuous band of veneer metal fusion welded to the base metal throughout their common extent, and adjusting the composition of the electrodes, their melting rates, the depth of fusion of the base metal and the movement of the gaps to produce a band of veneer metal of desired analysis, the gaps being submerged beneath the surface of the blanket of flux during the operation.

15. The method of coating base metal with a metal veneer which comprises, preheating the base metal to a predetermined temperature, covering a surface of the preheated base metal with a blanket of flux, discharging electric current through a gap beneath the surface of the flux blanket to fuse directly a depth of the base metal therebeneath, and supplying metal to the gap to be fused and intermingled with the fused metal of the base to form the veneer metal, said gap being submerged beneath the surface of the flux during the operation.

16. The method of coating base metal with a coating of veneer metal which comprises, covering a surface of the base metal with a protective blanket of flux, discharging electric current through a gap beneath the surface of the flux blanket between the end of an electrode and the surface of the base metal to fuse metal of the base into a molten pool, supplying metal of composition different from that of the base metal to the gap to be fused and intermingled in said molten pool, and effecting relative movement between the electrode and the base metal to form said molten pool into an elongated band of veneer metal fusion welded to the base metal throughout their common extent, the relative movement being such that the electrode travels in a zig-zag path over the surface of the base metal, the gap being submerged beneath the surface of the flux blanket during the operation.

17. The method of coating base metal with a coating of veneer metal which comprises, preheating the base metal to a predetermined temperature, covering a surface of the base metal with a protective blanket of flux, discharging electric current through a gap beneath the surface of the flux blanket between the end of an electrode and the surface of the base metal to fuse metal of the base metal into a molten pool, supplying metal of composition different from that of the base metal to the gap to be fused and intermingled in said molten pool, and effecting relative movement between the electrode and the base metal to form said molten pool into an elongated band of veneer metal fusion welded to the base throughout their common extent, the relative movement being such that the electrode travels in a zig-zag path over the surface of the base metal, the gap being submerged beneath the surface of the flux blanket during the operation.

ROBERT K. HOPKINS.